United States Patent
Gallant et al.

(10) Patent No.: US 8,484,848 B2
(45) Date of Patent: Jul. 16, 2013

(54) METHOD FOR THE ORBITAL ASSEMBLY OF AIRCRAFT SECTIONS MADE OF COMPOSITE MATERIAL

(75) Inventors: Guillaume Gallant, Plaisance du Touch (FR); Jean-Claude Lacombe, Blagnac (FR)

(73) Assignee: Airbus Operations S.A.S., Toulouse (FR)

( * ) Notice: Subject to any disclaimer, the term of this patent is extended or adjusted under 35 U.S.C. 154(b) by 311 days.

(21) Appl. No.: 12/995,535

(22) PCT Filed: May 26, 2009

(86) PCT No.: PCT/FR2009/050972
§ 371 (c)(1),
(2), (4) Date: Mar. 25, 2011

(87) PCT Pub. No.: WO2009/156637
PCT Pub. Date: Dec. 30, 2009

(65) Prior Publication Data
US 2011/0185555 A1    Aug. 4, 2011

(30) Foreign Application Priority Data

Jun. 2, 2008  (FR) ...................................... 08 03009

(51) Int. Cl.
*B21D 53/88*  (2006.01)
(52) U.S. Cl.
USPC .......................... 29/897.2; 29/889.2; 244/120
(58) Field of Classification Search
USPC ............. 29/897.2, 897, 889.2, 463, 464, 466; 244/119, 120, 132; 52/787.12
See application file for complete search history.

(56) References Cited

U.S. PATENT DOCUMENTS

| | | | |
|---|---|---|---|
| 2006/0060705 A1 | 3/2006 | Stulc et al. | |
| 2008/0111026 A1 | 5/2008 | Stulc et al. | |

FOREIGN PATENT DOCUMENTS

| | | |
|---|---|---|
| EP | 0 889 275 | 1/1999 |
| FR | 2 758 175 | 7/1998 |
| GB | 1 366 139 | 9/1974 |
| WO | 98 48207 | 10/1998 |

OTHER PUBLICATIONS

Human Translation of EPO Search Report; 2009.*
Campbell, F.C., "Manufacturing processes for advanced composites," Elsevier, Oxford, UK, pps. 290-291, (2004) XP 002509936.
International Search Report issued Dec. 10, 2009 in PCT/FR09/050972 filed May 26, 2009.

* cited by examiner

*Primary Examiner* — David Bryant
*Assistant Examiner* — Ryan J Walters
(74) *Attorney, Agent, or Firm* — Oblon, Spivak, McClelland, Maier & Neustadt, L.L.P.

(57) ABSTRACT

A method for assembling two structural elements, at least one of the two structural elements being tube-shaped and including a skin made of a fiber-reinforced composite material. The ability of the element to adapt to the shape and perimeter of a junction interface is improved by providing longitudinal grooves distributed on the circumference of the junction interface. The grooves are of a sufficient length to provide the junction interface with the flexibility to accommodate, through relative radial movement of each portion located between two grooves, differences in shape and perimeter among the junction interfaces of the two structural elements.

17 Claims, 5 Drawing Sheets

METHOD FOR THE ORBITAL ASSEMBLY OF AIRCRAFT SECTIONS MADE OF COMPOSITE MATERIAL

TECHNICAL FIELD

The invention falls within the sphere of structural assembly methods, especially for aeronautical structures such as fuselage or wing-group components. More particularly, the invention relates to the assembly of structural components at least partially made up of fiber-reinforced composite material.

BACKGROUND

There is known from the prior art the assembly of more or less tube-shaped structural components (1A to 1D) such as the junction of aircraft fuselage sections, as shown by FIG. 1, or the wing-group junction on the central box of the said fuselage.

Such junctions (100A to 100E) are referred to as orbital, because they are implemented following the periphery of the section of the components to be joined. The structural assembly of the components joined in this way is accomplished through fastenings such as rivets, this operation taking on the name of "orbital seam."

In order to ensure the mechanical continuity of the structure assembled in this way, the components must be in close contact at the junction. This implies that the two components are manufactured with precision so that at the junction interface the shapes of the two components are identical or fully complementary depending on whether the junction is implemented end to end or by interlocking.

According to this prior art, the structural components are made up of metal panels, referred to as "skin panels" or "skin," stiffened by longitudinal stiffeners, commonly called "stringers," and peripheral stiffeners, commonly referred to as "frames." Still according to the prior art, the stringers are assembled with the skin panel by riveting, just like the frames, the stringers, the frames and the skin also being joined together at the frames by splices, themselves riveted to these three components. The said splices are trihedral junction parts made in a single or several part(s), by folding or by swaging. The stiffened panels are assembled according to longitudinal seams so as to form a tube-shaped section. The longitudinal seams as well as the assembly of the stiffeners on the skin panels are implemented by fastenings such as rivets.

In order to allow a perfect fit at the junction, the fastenings of the longitudinal stiffeners are not installed between the end of the panel and the first frame, just as the longitudinal seam between the skin panels is not provided over this same distance. In this way there is a certain flexibility that makes it possible to adjust the shape and the perimeters of the junction interface of a structural component to that of the other structural component. In this way, close contact between the two components, a guarantee of mechanical continuity of the assembly, is obtained.

In order to lighten the structure and increase performances of the aircraft, it is known to replace the metal with fiber-reinforced composite materials. These materials are used in particular for the manufacture of skin panels. The manufacturing methods allowed by these materials advantageously make it possible to obtain larger-size panels; in this way a fuselage section may be implemented, for example, by the assembly of 4 panels following longitudinal seams. The said fuselage section even may be implemented without any longitudinal seam, in a single cylindrical part comprising all the longitudinal and peripheral stiffeners added by co-baking, such as described, for example, in the patent application US2006/060705 A1. According to this composition, the structural components are far more rigid and do not have sufficient flexibility to withstand the variations of shape and perimeter between the two components to be assembled at the orbital seams. The absence or the reduced number of longitudinal seams no longer makes it possible to impart sufficient flexibility through the absence of installation of fastenings at the seam end.

Defects in shape must be compensated by an optimized wedging of one section in relation to the other and by local compensation operations, in particular by additions of resin, an operation commonly referred to as "shimming." Defects in perimeters are far more difficult to correct. Thus, according to this prior art, a method for assembly of such a structural component with another structural component through an orbital junction comprises the steps consisting in:

measuring the junction interfaces of the two components deducing the optimal position of one component in relation to the other implementing the junction "blank" between the two components, that is to say, by installing only temporary fastenings measuring the spaces between the components by shims, deducing therefrom a "shimming" plan for each component taking apart the two components; this operation is commonly called "splitting"

performing the shimming describing the two components for the assembly and performing the assembly.

These operations of splitting and shimming are very disadvantageous in terms of productivity.

A need therefore exists for a method for assembly of structural components of this type which is both productive and economical while ensuring a fit of the shapes and perimeters of the components at the joining interface.

Furthermore, the composite materials making up the skin of such structural components do not have a sufficient surface hardness to allow an assembly by interlocking, which assembly requires a relative axial movement of one component in relation to the other.

In fact, such a movement could generate frictions likely to damage the folds located close to the contact surface and thus generate delaminations.

In this way, according to the prior art, the joining operations consist in:

aligning the two components positioned end to end fastening to the two components a ferrule made up of at least two parts and covering the junction, establishing the mechanical attachment between the components.

This operation, of course, also must be implemented "blank" during the step intended for measuring the interface defects.

It is known, for example from patent applications EP0889275A and FR2758175A as well as from patent GB1366139, to implement longitudinal slots at the end of tube-shaped structures such as channelings in order to facilitate assembly thereof. Such structures, however, do not comprise longitudinal and peripheral stiffeners such as, for example, the structural components making up the fuselage of an aircraft.

SUMMARY

So as to meet these needs, the invention proposes, according to a first embodiment, a method for orbital junction of two structural components, at least one of the two being tube-shaped and comprising a skin made of fiber-reinforced composite material. The ability to adapt to the shape and perimeter of the junction interface of this component is improved by implementing longitudinal slots distributed over the periphery of the junction interface.

This type of structural component generally is stiffened longitudinally by stringers. The said stringers advantageously are connected to the skin by bonding or co-baking. The slots are implemented in the skin, between the stringers, over a sufficient length to impart to the junction interface the flexibility appropriate for accommodating, through the relative radial movement of each portion located between two slots, the differences in shape and perimeter between the junction interfaces of the two structural components. When the structural component that is the object of the invention comprises peripheral stiffeners in the form of frames, the appropriate length of the said slots is at most equal to the distance between the end of the structural component and the first frame.

In order to further improve the flexibility of the junction interface, it is advantageous to take apart all or a portion of the longitudinal stiffeners, or stringers, of the skin, over a distance at least equal to the length of the slots and at most equal to the distance between the end of the structural component and the first frame. Once the assembly is implemented, the stiffeners again are fastened to the skin through fasteners such as rivets.

The individual skilled in the trade will understand that this implementation is particularly advantageous because it limits or even eliminates the shimming operations. He will note, however, that the presence of these slots in the composite skin poses both a problem of mechanical hold-up of the assembly, each slot constituting an incipient crack likely to propagate in the entire structural component under the effect of fatigue stresses, and a sealing problem with regard to the inside of the structural component, for example with regard to the pressurization inside the fuselage, as well as the outside with respect to moisture.

In order to limit these negative effects, the slots must be as narrow as possible, while imparting sufficient flexibility to the junction zone, and having a contour, particularly at the end, which does not further the concentration of stresses and the initiation of cracks. For this purpose, the end of the slot terminates with a blending radius equal to half the width of the slot. The slot thus advantageously may be implemented by milling with the aid of a milling cutter the diameter of which is equal to the width of the slot, or by cutting into sections, with the aid of a disc the contour of which has an appropriate radius. Advantageously, the slot will have a width ranging between 0.005 and 0.02 times its length.

In order to complete the assembly, splices are positioned so as to cover the slots and fastened to the skin and to the stiffeners by fasteners such as rivets. These splices make it possible on the one hand to fill up the slots after assembly and to prevent any propagation of cracks from the slots, the stress flows being drained by the splices toward the skin beyond the junction interface without passing through the slots. In order to limit the addition of weight, at the places where slots are located this splicing substitutes for the splicing normally implemented so as to connect the skin, the stringers and the frames.

These specific splices are elongated on the side where the slot is located.

Advantageously, the length of the slot is an inter-frame half-distance. This compromise makes it possible to obtain sufficient local flexibility without excessively elongating the splices.

According to a second embodiment, slots are implemented in the junction interfaces of the two structural components assembled according to the orbital junction. In this case, in order not to compromise the mechanical rigidity of the assembly, the slots of each component are arranged in staggered rows on both sides of the central junction line. The said junction may be reinforced by a ferrule. In this case, the ferrule may be fastened on a first component, then the second component slid on ferrule, the flexibility of the assembly interface making it possible to achieve this sliding without friction through the radial expansion of the assembly interface of the component.

DETAILED DESCRIPTION

The invention is described here in the case of the assembly of fuselage sections. The individual skilled in the trade easily will adapt these technical teachings to any type of orbital junction, circular shaped or otherwise, for which a precise adaptation of the junction interfaces in both shape and perimeter is necessary. By way of non-limitative example, it may relate to the junction of the wing group with the fuselage.

It is to be noted that the invention advantageously may be applied even in cases of orbital junctions of metal sections according to the prior art.

Figure 1:
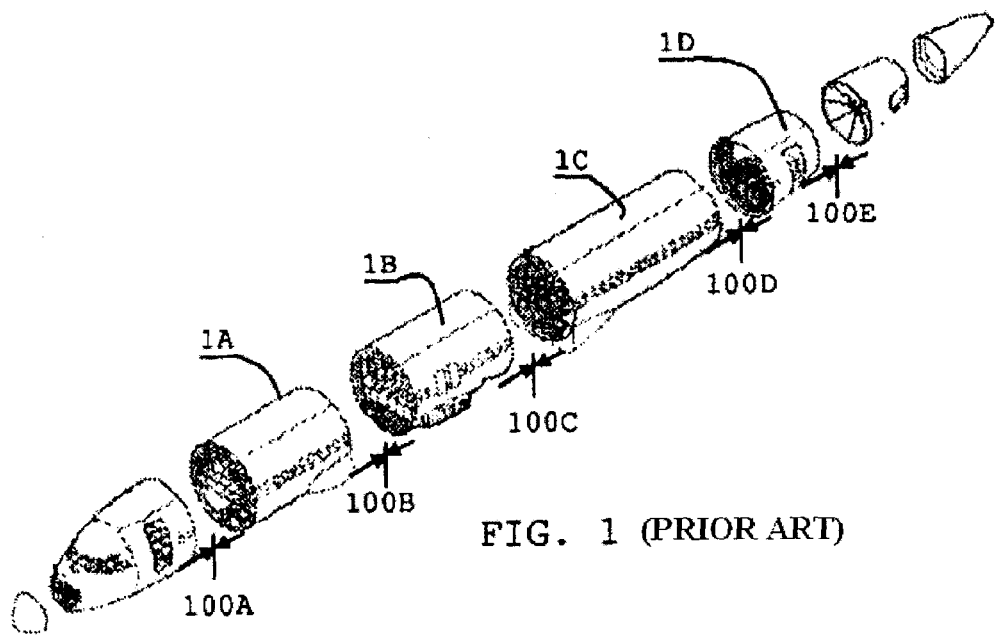
FIG. 1 shows an example of the different orbital junctions occurring in the composition of an airplane fuselage.

FIG. 1 is an exemplary location of orbital junctions (100A to 100E) in the composition of an aircraft fuselage from tube-shaped sections (1A to 1D).

Figure 2:
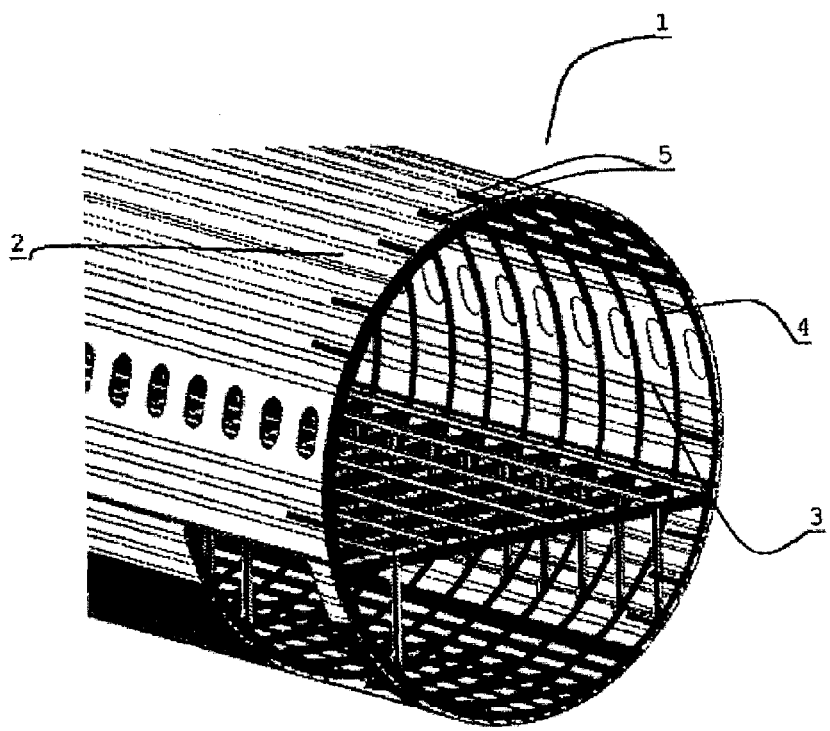
FIG. 2 shows a perspective view of a junction interface of a fuselage section, comprising slots evenly distributed over its periphery.

Such sections (1), FIG. 2, comprise a skin (2) stiffened with longitudinal stiffeners (3) or stringers, and peripheral stiffeners (4) or frames. These frames are distributed evenly over the length of the section according to a defined inter-frame distance. This inter-frame distance typically ranges between 500 mm and 700 mm. According to the invention, slots (5), extending longitudinally, are distributed over the periphery of the section at the end thereof, so as to obtain at this end the necessary flexibility in order that it may adapt in shape and perimeter to the junction with the other section that is the object of the orbital junction. Advantageously, the slot will have a width of 4 mm for a length equal to half the inter-frame distance.

Figure 3:
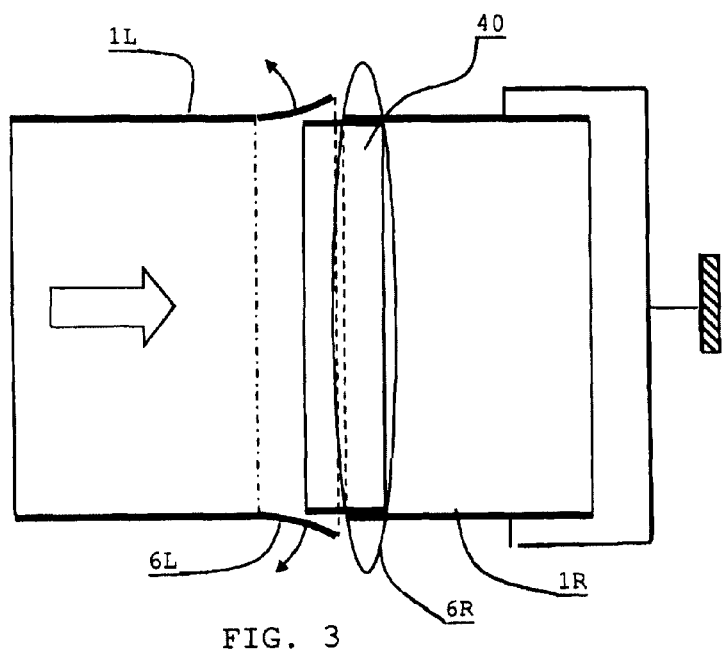
FIG. 3 schematically shows the implementation of the method for assembly of two fuselage sections according to an orbital junction

The general principle of the assembly method, shown on FIG. 3, comprises the steps consisting in fastening an intermediate assembly component (40) to the junction interface (6R) of a first section (1R). This intermediate component may be a frame or a peripheral stiffener located at the end of the section (1R) or a ferrule, when the junction is located in an inter-frame.

The junction interface (6L) of the other section to be assembled (1L) is expanded so as to be able to slide the said interface on the intermediate component (40) without friction. Once the appropriate longitudinal position is achieved, the expansion is released and the assembly is implemented.

In order to describe this embodiment in further detail, two junction cases are to be considered, depending on whether the orbital junction is subjected to a significant stress flow, particularly in bending, mainly for the junctions located on both sides of the central wing-group box (100B, 100C), or to a lesser load for the other junctions.

Figure 4:
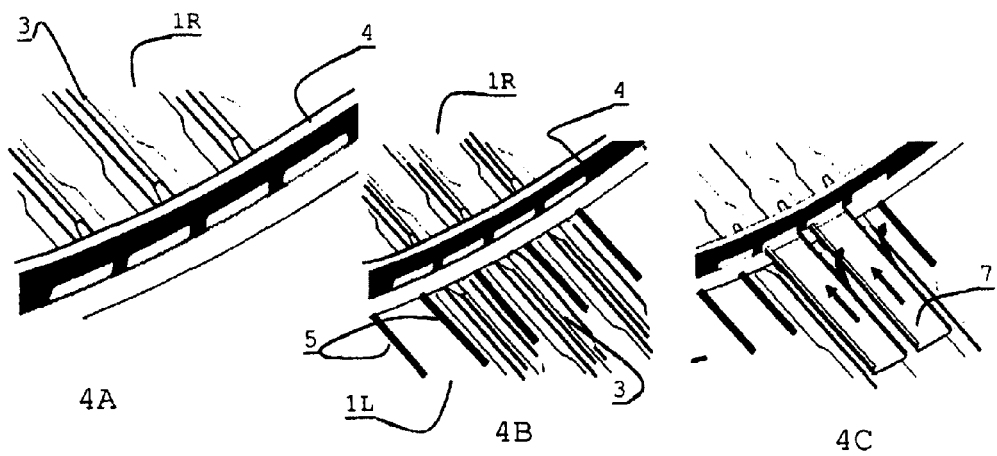
FIG. 4 shows the different phases of assembly of an orbital junction according to the invention in a heavily loaded zone, with FIG. 4A the pre-installation of a frame on the junction interface of a first section, 4B, the assembly on this interface of a second section, equipped with slots and 4C the installation of splices.
Figure 5:
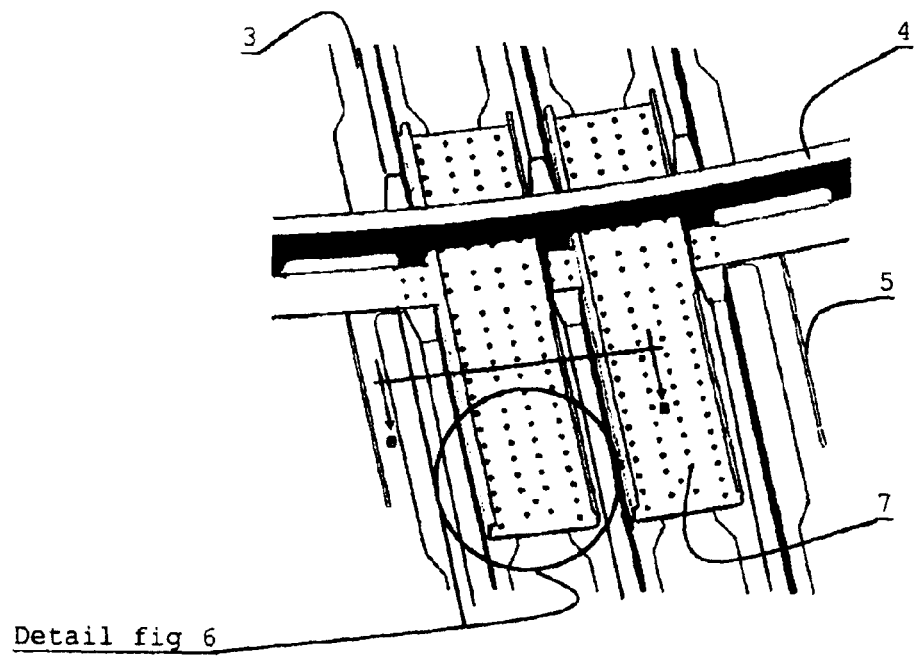
FIG. 5 shows a part of the junction implemented in this way, seen from the inside of the fuselage
Figure 6:
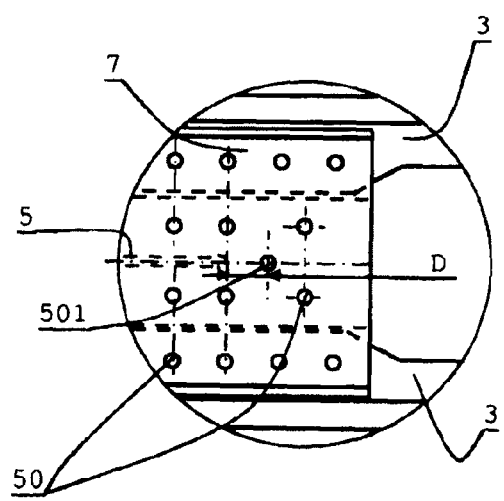
FIG. 6 is a detail of installation of fastenings in splices.
Figure 7:
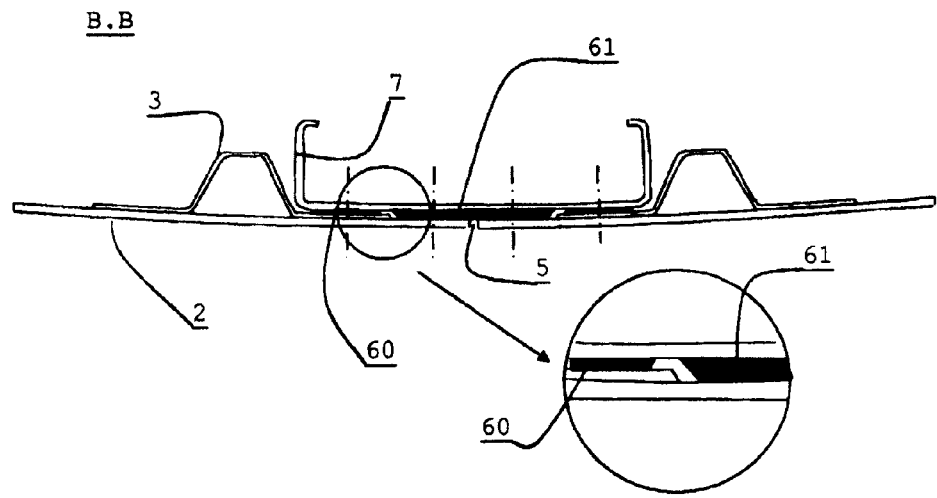
FIG. 7 is a cross-section view at the splices of FIG. 5
Figure 8:
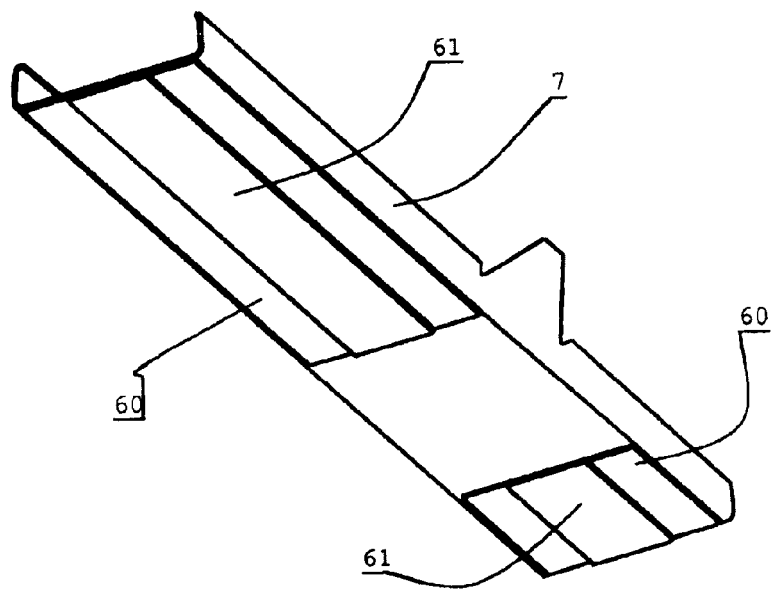
FIG. 8 is a perspective view of the splices seen from below

In the first case, FIG. 4, the frame (4) is pre-installed at the end of the first section (1R), FIG. 4A. FIG. 4B, the second section (1L), having slots (5) is introduced, slid and fitted on the frame (4) fastened to the end of the first section (1R). FIG. 4C, assembly takes place by the installation of fastenings between the frame (4) and the second section (1L). The junction is reinforced by splices (7) which interlock the frame (4), the skins of the two sections and the stringers with regard to the two sections (1R, 1L). These splices (7) cover the slot (5) on the side of the second section (1L). FIGS. 5 and 6 present the detail of the installation of the splices and fastening thereof.

The splices (7) are themselves interlocked with the skin, the frame (4) and the stringers (3) by rivet-type fastenings (50). Such fastenings are installed in counter-drilled holes at the time of assembly. The nature of these rivet- or "lockbolt"-type fastenings allows an assembly without play in the counter-drilled holes and the setting up of a tension along the axis of the said fastenings. The cooperation between the splices (7) and the fastenings (50) drains the stress flows without their stressing the slots (5) on opening and thus leading to the propagation of cracks from these slots under the effect of the operating stresses to which the structure is subjected.

In order to compensate the differences in height among the stringer bases, the inner face of the skin and the thickness of the frame base, patches (60, 61) are installed underneath the splices. The said patches advantageously consist of a composite plate of appropriate thickness added underneath the splice by co-baking or bonding. Through these patches, which allow a full contact among the splices, the different surfaces and the fastenings (50), sealing of the junction is ensured, the slots themselves being filled with sealing compound after assembly.

The presence of these patches also makes it possible to locally increase the strength of the splices so as to withstand the tension set up by the fastenings.

In order to ensure this sealing but also to avoid the propagation of cracks from the slots (5), it is advantageous to position a fastening (501) at a distance (D) ranging between one and 3 times the diameter of the fastening in the axis of the slots, preferably at 3 times the diameter of the fastening.

Thus for an inter-frame distance of 625 mm and a distance between stringers of 178 mm, the slots will have a width of 4 mm for a length of a half inter-frame distance associated with fastenings of standardized 4.8 mm diameter. The fastening positioned in the extension of the median axis of the slot will be installed at a distance of 14.4 mm ranging between the end of the slot and the center of the said fastening.

In order to facilitate assembly and obtain more elasticity at the assembly interface in the presence of a composite fuselage the stringers (3) of which are connected to the skin (2) by co-baking, it is advantageous that the stringers are separated from the skin over a maximal distance equivalent to an inter-frame distance. This separation is achieved by interposing a film between the stringers and the skin prior to co-baking, the said film preventing any adhesion between the two components (3, 2). A film consisting of two co-laminated films of polyethylene and polyester respectively with a thickness on the order of 70 µm makes it possible to avoid any adhesion without bringing about deformation of the stringers. The non-adherent zone is assembled with the skin by riveting through the splices (7) during assembly.

Such films are available commercially under the name "PEPOLIT® 50/20" from the company "EFFIGIDI International."

Figure 9:
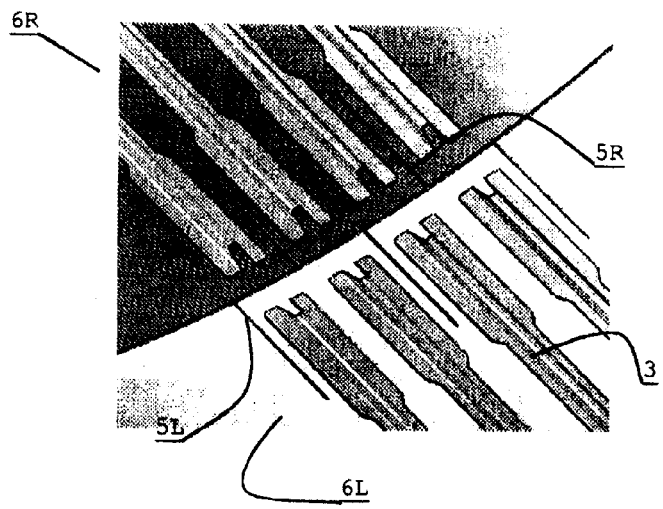
FIG. 9 presents a view from the inside of the fuselage of an orbital junction part subjected to a weak stress flow for which the junction interfaces of the two sections comprise slots FIG. 10 (10A to 10D)) is a synopsis of the assembly process for a junction passing a weak stress flow by means of a ferrule
Figure 10:
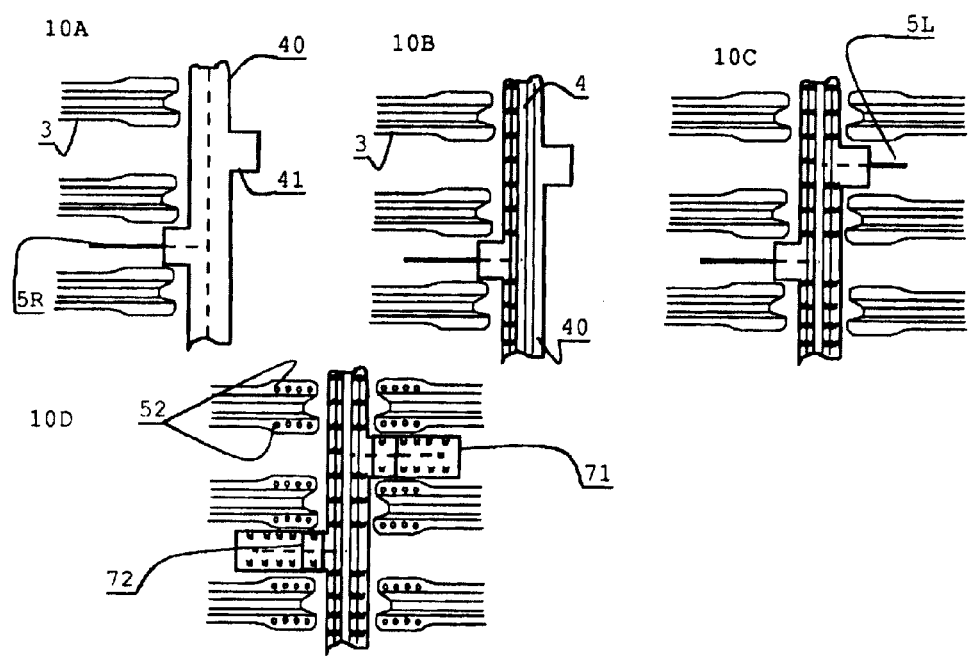

When the junction is subjected to less intense stress flows, the ease of assembly still may be improved by implementing slots (5L, 5R) on the two sections to be assembled. In this case the slots facing one another preferably are arranged in staggered rows so as to obtain both an adaptability of shape and an optimal mechanical strength of the assembly, FIG. 9. As before, the stringers (3) advantageously are separated from the skin over a certain distance less than an inter-frame distance starting from the assembly interface. They again will be fastened to the skin, this time without the intermediary of splices, by rivet-type fastenings (51). According to this embodiment, FIG. 10, a ferrule (40) is installed on the first section and fastened through the intermediary of rivet-type fastenings. Such a ferrule has extensions (41) capable of covering at least partially the slots located on the two sections or on only one of them, depending on whether the solution uses slots on both sides of the junction or not (FIG. 10A). Such a ferrule then may be in the form of a single more or less circular-shaped part corresponding to the shape of the junction interface or, if it is made up of several sections, be assembled beforehand.

A frame spanning the assembly interface (40) is installed on this same section and fastened both to the skin of the section and to the ferrule (40) by rivet-type fastenings (FIG. 10B).

The second section is slid on the ferrule, its own slots (5L) making it possible on the one hand to adapt to the shape of the ferrule (40) and the frame (4) and on the other hand to expand the assembly interface so as to avoid any friction during this sliding. The ferrule 40 and the frame (4) are connected by riveting to this second section (FIG. 10C). The stringer parts initially separated are connected to the skin by rivet-type fastenings (FIG. 10D). If the extensions (41) of the ferrule (40) do not cover the entirety of the length of the slots (5L, 5R), splices (71) are arranged and fastened to the skin and to the extensions (41) of the ferrule (40) by rivet-type fastenings. In this embodiment, where the stress flows are weaker, the splices (71) are simpler to implement and do not require introducing a significant inertia in bending. They therefore occur as plates having a joggle (72) or a shoulder, to compensate the difference in height between the skin and the edge of the extensions (41) of the ferrule. Such splices are fastened only to the skin and do not cover the bases of stringers (3). As before, the fastening of these splices to the skin will comprise a fastening located at a distance ranging between one and three times the diameter of the said fastening from the end of the slot in the extension of the median axis of the said slot.

The invention claimed is:

1. A method for orbital junction of two structural components, at least one of the two structural components being tube-shaped including a fiber-reinforced composite material having longitudinal stiffeners and including a skin, the skin being connected to the longitudinal stiffeners by co-baking and being connected to at least one peripheral stiffener prior to a junction operation, the method comprising steps of:
    locally separating the longitudinal stiffeners from the skin, prior to the junction operation, at an end of a junction interface to a first distance less than or equal to an inter-frame distance; and
    implementing in the skin, located at the junction interface of the at least one of the two structural components, a plurality of slots distributed over a periphery of the junction interface, the plurality of slots extending longitudinally between and in parallel with two longitudinal stiffeners over a second distance less than or equal to the inter-frame distance.

2. The method according to claim 1, further comprising steps of:
    locally interpositioning, during the locally separating step, a film configured to prevent adhesion between the skin and the longitudinal stiffeners during the co-baking operation, and
    re-assembling the longitudinal stiffeners and the skin, having the film interposed therebetween, together after joining by installation of rivet-type fastenings.

3. The method according to claim 2, further comprising a step of fastening splices, after the junction operation, to the skin and to the longitudinal stiffeners, the splices covering each of the plurality of slots and being located between the longitudinal stiffeners of the at least one of the two structural components.

4. The method according to claim 3, wherein the plurality of slots have a first width, and
    wherein an end of the plurality of slots has a semi-circular shape with a radius that is half of the first width.

5. The method according to claim 4, further comprising steps of:
    positioning a center of at least one fastening member between a splice of the splices and the skin at a median axis of a slot of the plurality of slots, and
    positioning the center of the at least one fastening member at a distance of 1 to 3 times a diameter of the at least one fastening member from the end of the plurality of slots.

6. The method according to claim 5, wherein the at least one fastening member is a rivet or a lockbolt-type fastener.

7. The method according to claim 3, further comprising a step of installing patches underneath the splices by co-baking or bonding.

8. The method according to claim 1, wherein both of the two structural components are tube-shaped and include the plurality of slots, the plurality of slots being arranged in staggered rows following the periphery of the junction interface.

9. The method according to claim 8, further comprising a step of connecting the two structural components together via a ferrule.

10. The method according to claim 9, wherein the ferrule includes at least one extension that at least partially covers at least one of the plurality of slots of the two structural components.

11. The method according to claim 1, wherein the locally separating step includes separating the longitudinal stiffeners from the skin at the end of the junction interface to the first distance less than or equal to the inter-frame distance, the inter-frame distance being equal to a length from an end of the at least one of the two structural component to the at least one peripheral stiffener.

12. The method according to claim 11, wherein a maximum distance separating the two longitudinal stiffeners is equal to the inter-frame distance.

13. The method according to claim 1, wherein the locally separating step includes separating the longitudinal stiffeners from the skin at the end of the junction interface to the first distance less than or equal to the inter-frame distance, the inter-frame distance being between 500 mm to 700 mm.

14. The method according to claim 13, wherein the inter-frame distance is 625 mm and a distance between the two longitudinal stiffeners is 178 mm.

15. The method according to claim 1, wherein a width of the plurality of slots, perpendicular to a direction of the longitudinal stiffeners, is narrower than a length of the plurality of slots.

16. The method according to claim 15, wherein the width of the plurality of slots is 0.005 and 0.02 times the length of the plurality of the slots.

17. The method according to claim 15, wherein the first distance is also greater than or equal to the length of the plurality of the slots.

* * * * *